Oct. 11, 1955          G. C. HART          2,720,414
UTILITY RACK FOR PICK-UP TRUCK
Filed Feb. 13, 1953
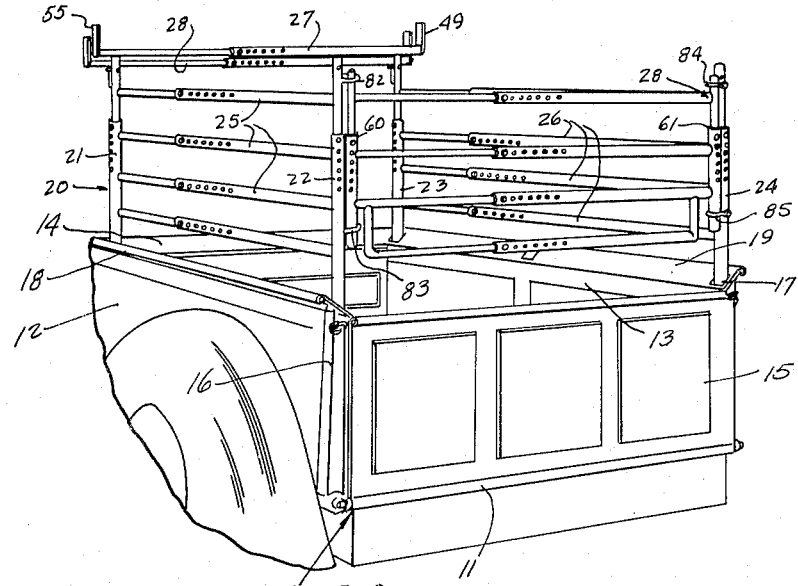
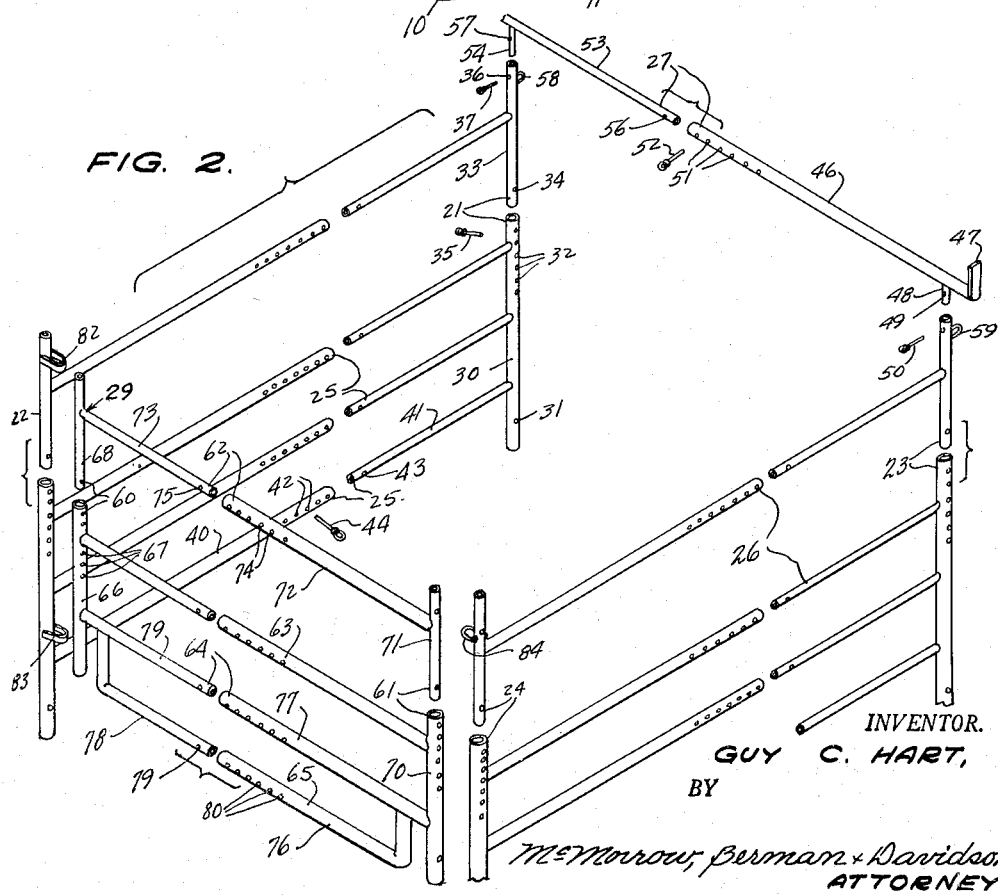
INVENTOR.
GUY C. HART,
BY
McMorrow, Berman & Davidson
ATTORNEYS.

United States Patent Office 2,720,414
Patented Oct. 11, 1955

2,720,414

UTILITY RACK FOR PICK-UP TRUCK

Guy C. Hart, Grover City, Calif.

Application February 13, 1953, Serial No. 336,766

4 Claims. (Cl. 296—12)

This invention relates to utility racks for pick-up trucks and more particularly to a demountable rack provided in a plurality of separate parts or sections that can be easily assembled with and removed from a pick-up truck body as may be necessary or desired.

It is among the objects of the invention to provide an improved utility rack for a pick-up truck which is formed entirely of tube sections and in separate parts that can be assembled with and removed from a pick-up truck body with no material modification of the truck body construction; which is adjustable in size to compensate for variations in the size of different truck bodies and adjustable in height for different kinds of loads; which is convertible by the addition or removal of parts to carry various types of loads, such as bagged or baled material, lumber and other building materials, or livestock; which is securely mounted on the associated truck body with no special fasteners or brackets; and which is simple and durable in construction, economical to manufacture, and effective and efficient in use.

Other objects and advantages will become apparent from a consideration of the following description and the appended claims in conjunction with the accompanying drawing, wherein:

Figure 1 is a perspective view of a pick-up truck body with a utility rack illustrative of the invention operatively mounted thereon; and Figure 2 is an exploded perspective view of the utility rack illustrated in Figure 1.

With continued reference to the drawing, the pick-up truck body, generally indicated at 10, has a floor 11 of rectangular shape, side panels 12 and 13 extending one along each longitudinal edge of the floor and upstanding perpendicularly from the floor, a front panel 14 extending along the front edge of the floor and upstanding perpendicularly from the floor, a tail gate 15 hingedly connected to the rear edge of the floor and having an operative position in which it extends between the rear ends of the side panels 12 and 13, and vertically disposed, hollow standards 16 secured to the side panels 12 and 13 one at each end of each side panel exteriorly thereof and opening at their upper ends through apertures 17 through upwardly and outwardly inclined top edge portions 18 and 19 of the side panels.

The utility rack, as generally indicated at 20, comprises four adjustable length corner posts 21, 22, 23 and 24 vertically disposed one at each corner of the truck body 10 and each having its lower portion received in a hollow standard 16 of the truck body to support the corner post in upright position on the truck body. The rack also includes adjustable length bars, as indicated at 25, extending between the front corner post 21 and the rear corner post 22 at the same side of the truck body and disposed in spaced apart and substantially parallel relationship to each other and perpendicular to the corresponding corner post and similarly arranged, adjustable length bars, as indicated at 26, extending between the front corner post 23 and the rear corner post 24 at the other side of the body and the rack also includes an adjustable length cross bar 27 extending over the top end of the front corner posts 21 and 23 and detachably secured to these corner posts. The rack may further include, for special purposes, a rear adjustable length cross bar 28 which, when in operative position, extends across the top ends of the rear corner posts 22 and 24 and is detachably secured to these rear corner posts, and an adjustable width gate, generally indicated at 29, hingedly connected at one side to one of the rear corner posts by disconnectible hinge connections and detachably connected at its other side to the other rear corner post.

All of the corner posts are of the same construction and each corner post, as is particularly indicated for the corner post 21 in Figure 2, comprises a tube section 30 received at its lower end in the corresponding standard 16 of the truck body and having near its lower end a diametrically disposed aperture 31 which may receive a pin extending through an aperture in the truck body and through the aperture 31 to releasably secure the lower section of the corner post in the corresponding standard of the truck body. The section 30 has near its upper end a series of diametrical apertures 32 spaced apart longitudinally of the tube section and the corner post further includes an upper tube section 33 having an outside diameter substantially the same as the inside diameter of the tube section 30 and telescopically received at its lower end in the upper end of the corresponding tube section 30. The upper tube section 33 has near its lower end a diametrical aperture 34 which receives a pin 35 extending through the aperture 34 in the tube section 33 and a selected aperture 32 of the series of apertures in the tube section 30 to secure the tube section 33 in selected positions of longitudinal adjustment relative to the lower tube section 30. The upper tube section 33 also has near its upper end a diametrical aperture 36 receiving a pin 37 for a purpose to be presently described.

Each of the adjustable length side bars, as indicated for the lower side bar 25 in Figure 2 comprises a tube section 40 rigidly secured to the lower tube section of the corresponding rear corner post 22 and projecting perpendicularly from the rear corner post toward the corresponding front corner post, and a tube section 41 rigidly secured at one end to the corresponding front corner post 21 and extending perpendicularly from the front corner post toward the associated rear corner post. The tube section 41 has an outside diameter substantially the same as the inside diameter of the tube section 40 and is telescopically received at its end remote from the associated front corner post in the end of the tube section 40 remote from the associated rear corner post. The tube section 40 is provided near its end remote from the associated rear corner post with a series of diametrical apertures 42 spaced apart longitudinally of the tube section and the tube section 41 is provided near its end remote from the associated front corner post with a diametrical aperture 43. When the two tube sections 40 and 41 are telescopically associated, as illustrated in Figure 1, a pin 44 extends through the diametrical aperture 43 in the tube section 41 and through a selected aperture 42 of the series of apertures in the tube section 40 to secure the two tube sections of the side bar together in selected positions of longitudinal adjustment relative to each other.

In the arrangement illustrated there are three side bars secured to the lower sections of the corresponding front and rear corner posts and disposed in substantially equally spaced apart and parallel relationship to each other and a top side bar secured to the upper tube sections of the corresponding front and rear corner posts and disposed substantially parallel to the three lower side bars.

The length of the rack can be adjusted by varying the length of the variable length side bars at the respectively opposite sides of the rack and the height of the rack can be adjusted by varying the length of the variable length corner posts, in the manner indicated above. Obviously, varying the length of the corner post will move the top side bar at each side of the rack toward or away from the uppermost side bar connected to the lower tube section of the corner post and the top side bar will remain near the top of the rack regardless of the height adjustment of the rack.

The construction so far described comprises separate parts including the four lower corner post tube sections with the three side bar sections attached to each such lower corner post tube section, the four upper corner post tube sections with a side bar section attached to each upper tube section, the two-part cross bar 27 and the four-part gate 29 making in all fourteen separate parts each of comparatively small size with the addition of two parts when the two-part cross bar is used. As all of the separate parts are flat, that is, having their center lines substantially in a common plane, the parts can be stacked together in a small space for storage and can be easily handled when assembled with the associated truck body to provide the rack.

The two cross bars 27 and 28 are of the same construction and the front cross bar, as particularly designated in Figure 2, includes a tube section 46 having at one end a perpendicularly extending projection or standard 47 and near the standard 47 a tubular extension 48 projecting perpendicularly therefrom in the direction opposite the standard 47 and provided with a diametrical aperture 49. The projection 48 is received in the upper end of one of the front corner posts, for example, in the top end of the corner post 23, and secured therein by pin 50 extending through a diametrical aperture in the corner post upper tube section near the upper end of this tube section and the diametrical aperture 49 in the projection 48. Near its other end the tube section 46 is provided with a series of apertures 51 spaced apart longitudinally of the tube section and adapted to receive a locking pin 52. The cross bar 27 also includes a tube section 53 having an outside diameter substantially equal to the inside diameter of the tube section 46 and telescopically received at one end in the end of the tube section 46 having the series of apertures 51. Near its other end the tube section 53 is provided with a perpendicularly extending projection 54 and outwardly of the projection 54 with an upstanding standard 55. Near its end remote from the projection 54 the tube section 53 is provided with a diametrical aperture 56 and the pin 52 is insertible through a selected aperture 51 in the section 46 and through the aperture 56 in the section 53 to secure the sections 53 and 46 together in selected positions of longitudinal adjustment relative to each other. The projection 54 is received in the top end of the upper tube section 33 of the corner post 21 and is secured to the corner post 21 by the pin 37 extending through the aperture 36 near the upper end of the tube section 33 and through a diametrical aperture 57 in the projection 54.

When the two cross bars are mounted on the rack, one on the front corner post and one on the rear corner post, the rack is conditioned to carry elongated material, such as lumber, and the cross bars may be elevated to a position at which the lumber carried thereon will extend over the top of the cab of the truck. When the rear cross bar is not in use, it may be carried in loops 58 and 59 mounted on the upper tube sections of the front corner posts 21 and 23 below the top ends of the corner posts and at the front sides thereof, as illustrated in Figure 1.

The gate 29 is used when it is desired to use the utility rack for hauling livestock and this gate comprises side members 60 and 61 and cross bars 62, 63, 64 and 65. The side member 60 includes a lower tube section 66 adapted to be vertically disposed along the lower tube section of one of the rear corner posts and having near its upper end a series of apertures 67 spaced apart longitudinally of this tube section, and an upper tube section 68 having an outside diameter substantially equal to the inside diameter of the tube section 66 and telescopically received at its lower end in the upper end of the tube section 66. A suitable pin extends through a diametrical aperture near the lower end of the tube section 68 and through a connected aperture 67 of the series of apertures in the lower tube section 66 to secure the sections 66 and 68 together in selected positions of longitudinal adjustment relative to each other.

The side member 61 is identical in construction to the side member 60 and includes a lower tube section 70 and an upper tube section 71 slidably received at its lower end in the upper end of the section 70.

The top gate bar 62 comprises a tube section 72 rigidly secured at one end to the upper side member section 71 and extending perpendicularly from the section 71 and a tube section 73 secured at one end to the upper side member section 68 and extending perpendicularly from the section 68. The section 73 has an outside diameter substantially equal to the inside diameter of the section 72 and is slidably received at its end remote from the section 68 in the end of the section 72 remote from the section 71. The section 72 is provided near its end remote from the section 71 with a series of apertures 74 spaced apart longitudinally of this section and the section 73 is provided near its end remote from the section 68 with a diametrical aperture 75 selectively registrable with the aperture 74 and a suitable pin extending through the aperture 75 and a selected one of the apertures 74 releasably secures the top bar sections 72 and 73 together in selected positions of longitudinal adjustment relative to each other. The intermediate gate bars 63 and 64 are similar in construction to the top bar 62 described above except that one tube section of each of these intermediate bars is secured to the lower tube section 66 of the side member 60 and the complementary tube sections are secured to the lower tube section 70 of the side member 61. The bottom bar 65 is mounted on the bar 64 and includes a tube section 76 of right angular shape one leg of which is secured at one end to the tube section 77 near the tube section 70 and extends perpendicularly from the tube section 77 and the other leg of which is disposed below and parallel to the tube section 77, and a tube section 78 of right angular shape one leg of which is secured at one end to the tube section 79 of the bar 64 and depends perpendicularly therefrom and the other leg of which is disposed below and substantially parallel to the tube section 79. The section 78 is slidably received at its distal end in the distal end of the section 76 and the sections 78 and 76 are secured together in selected positions of longitudinal adjustment relative to each other by pins extending through a diametrical aperture 80 in the section 78 near the distal end of the leg thereof received in the corresponding leg of the section 76 and through a selected one of a series of diametrical apertures 80 in the section 76.

The gate is detachably secured to the rack by inserting the upper and lower ends of the gate side member 60 through loops 82 and 83 mounted on the rear corner post 22 at locations spaced apart longitudinally of this corner post and extending from the corner post 22 toward the complementary rear corner post 24 and by inserting the upper and lower ends of the gate side members 61 through loops 84 and 85 similarly mounted on the rear corner post 24. The side members 60 and 61 of the gate can be inserted through the corresponding loops on the rear corner posts by first shortening these side members and then extending them so that the upper and lower end portions thereof are engaged in the corresponding loops.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the range of equivalency of the claims are, therefore, intended to be embraced therein.

What is claimed is:

1. In combination with a pick-up truck body having vertically disposed hollow standards at its corners, a utility rack comprising adjustable length corner posts disposed one at each corner of said body and disposed at their lower ends in the corresponding hollow standards, adjustable length side bars extending between the front and rear corner posts at the corresponding sides of the body and disposed in spaced apart parallel relationship to each other and substantially perpendicular to the associated corner posts, and an adjustable length cross bar extending across the top ends of the front corner posts and detachably secured thereto, each of said side bars comprising a first tubular section secured at one end to a corner post section and projecting perpendicularly therefrom, a second tubular section rigidly secured at one end to another corner post section and projecting perpendicularly therefrom and slidably receiving at its end remote from the associated corner post section the distal end of said first side bar tube section, and means interconnecting said side bar tube sections in selected positions of longitudinal adjustment relative to each other.

2. In combination with a pick-up truck body having vertically disposed hollow standards at its corners, a utility rack comprising adjustable length corner posts disposed one at each corner of said body and disposed at their lower ends in the corresponding hollow standards, adjustable length side bars extending between the front and rear corner posts at the corresponding sides of the body and disposed in spaced apart parallel relationship to each other and substantially perpendicular to the associated corner posts, an adjustable length cross bar extending across the top ends of the front corner posts and detachably secured thereto, and an adjustable length cross bar extending across the top ends of the rear corner posts and detachably secured thereto, each of said side bars comprising a first tubular section secured at one end to a corner post section and projecting perpendicularly therefrom, a second tubular section rigidly secured at one end to another corner post section and projecting perpendicularly therefrom and slidably receiving at its end remote from the associated corner post section the distal end of said first side bar tube section, and means interconnecting said side bar tube sections in selected positions of longitudinal adjustment relative to each other.

3. In combination with a pick-up truck body having vertically disposed hollow standards at its corners, a utility rack comprising adjustable length corner posts disposed one at each corner of said body and disposed at their lower ends in the corresponding hollow standards, adjustable length side bars extending between the front and rear corner posts at the corresponding sides of the body and disposed in spaced apart parallel relationship to each other and substantially perpendicular to the associated corner posts, and an adjustable length cross bar extending across the top ends of the front corner posts and detachably secured thereto, each of said corner posts comprising a first tubular section, a second tubular section slidably received in one end of said first tubular section and means releasably securing said first and second tubular sections together in selected positions of longitudinal adjustment relative to each other, and each of said side bars comprising a first tubular section secured at one end to a corner post section and projecting perpendicularly therefrom, a second tubular section rigidly secured at one end to another corner post section and projecting perpendicularly therefrom and slidably receiving at its end remote from the associated corner post section the distal end of said first side bar tube section, and means interconnecting said side bar tube sections in selected positions of longitudinal adjustment relative to each other.

4. In combination with a pick-up truck body having vertically disposed hollow standards at its corners, a utility rack comprising adjustable length corner posts disposed one at each corner of said body and disposed at their lower ends in the corresponding hollow standards, adjustable length side bars extending between the front and rear corner posts at the corresponding sides of the body and disposed in spaced apart parallel relationship to each other and substantially perpendicular to the associated corner posts, an adjustable length cross bar extending across the top ends of the front corner posts and detachably secured thereto, and an adjustable width gate hingedly secured at one side to one of the rear corner posts by disconnectible hinge connections and releasably connected at its other side to the other rear corner post, said gate comprising side members each including tube sections one of which is slidably received at one end in one end of the other and gate bars each including tube sections one of which is rigidly secured at one end to one side member and the other of which is rigidly secured at one end to the other side member with one gate bar section slidably received at its distal end in the distal end of the complementary gate bar section, and means releasably securing said gate bar sections together in selected positions of longitudinal adjustment relative to each other.

References Cited in the file of this patent

UNITED STATES PATENTS

| 743,112 | Tanner | Nov. 3, 1903 |
| 1,563,244 | Weeth | Nov. 24, 1925 |
| 1,671,848 | Wallace et al. | May 29, 1928 |
| 1,860,119 | Standish | May 24, 1932 |
| 1,884,333 | Standish | Oct. 25, 1932 |
| 2,491,577 | Olinger | Dec. 20, 1949 |
| 2,601,684 | Martin | July 1, 1952 |
| 2,618,820 | Struben et al. | Nov. 25, 1952 |

FOREIGN PATENTS

| 741,980 | France | Dec. 20, 1932 |